(12) United States Patent
Meier

(10) Patent No.: US 6,614,942 B1
(45) Date of Patent: Sep. 2, 2003

(54) CONSTANT BITRATE ALGORITHM FOR BLOCK BASED IMAGE COMPRESSION

(75) Inventor: Fabian Meier, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/466,398

(22) Filed: Dec. 17, 1999

(51) Int. Cl.$^7$ ................................................. G06K 9/36
(52) U.S. Cl. ........................ 382/251; 382/232; 382/233
(58) Field of Search .................................. 382/232, 233, 382/234, 235, 236, 237, 238, 239, 240, 241, 242, 243, 244, 245, 246, 247, 248, 249, 250, 251, 252, 253

(56) References Cited

U.S. PATENT DOCUMENTS

| | | | |
|---|---|---|---|
| 5,592,226 A | * | 1/1997 | Lee et al. .............. 375/240.14 |
| 5,657,015 A | * | 8/1997 | Nakajima et al. ............. 341/61 |
| 5,793,898 A | * | 8/1998 | Nakamoto ................... 382/250 |
| 6,188,792 B1 | * | 2/2001 | Chujoh et al. .............. 382/236 |
| 6,212,232 B1 | * | 4/2001 | Reed et al. ............ 375/240.03 |

* cited by examiner

Primary Examiner—Bhavesh M. Mehta
Assistant Examiner—Ali Bayat
(74) Attorney, Agent, or Firm—Lee & Hayes, PLLC

(57) ABSTRACT

A method of compressing image data to achieve a desired compression ratio corresponding to a desired file size. A target compression ratio (the ratio of uncompressed image data to compressed image data) is specified. A subset of the image data is selected. A first quantization parameter is selected, the subset of the image data is compressed using that quantization parameter, and the resulting compression ratio is calculated. A second quantization parameter is then selected, the subset of the image data is compressed using the second quantization parameter, and the resulting compression ratio is calculated. A target quantization parameter corresponding to the target compression ratio is calculated by interpolating between the first quantization parameter and the second quantization parameter and the corresponding compression ratios. The target quantization parameter is applied to the entire set of image data to compress the image data at approximately the target compression ratio. As a result, the size of the file containing the compressed data is approximately the same as the target file size. The present invention allows rate control in less computation time than it takes to compress the image; the time to estimate the target quantization parameter can be done in less computation time than needed to compress the full image.

25 Claims, 6 Drawing Sheets

305

306

307

LUMINANCE Y

308

CHROMA Cb

309

CHROMA Cr

CONSTANT BITRATE ALGORITHM FOR BLOCK BASED IMAGE COMPRESSION

TECHNICAL FIELD

The present invention pertains to the field of data compression. In particular, the present invention pertains to a constant bitrate method for lossy image compression.

BACKGROUND ART

Image data (including video data) are acquired when a picture (or movie) is taken with a conventional camera and scanned, or when a picture (or movie) is captured with a digital camera. Image data are also acquired through the use of a three-dimensional rendering program (e.g., a computer graphics program) executed on a computer system.

Image data can comprise a significant amount of data. A single frame in a quality image may include an array of up to 4000 by 2000 pixels, each pixel described by several color values (for example, by Red, Green and Blue, or by one Luminance and two Chroma). Thus, a video running at, for example, 30 frames per second normally requires a tremendous amount of image data to be stored, retrieved from memory and processed. Obviously, this consumes a large portion of a computer system's processing resources; specifically, it can take up a lot of costly hard disk space.

To address these problems, image data can be compressed to reduce the amount of data without significantly affecting the fidelity of the image. Various image compression schemes known in the art exist to accomplish this, such as the JPEG (Joint Photographic Experts Group) compression scheme or the MPEG (Motion Pictures Experts Group) compression scheme. These compression schemes work well to reduce the amount of image data. Even though these compression methods are lossy, usually the loss is not recognizable by the human visual system. Lossy image compression takes advantage of the inherent spatial redundancy of image data. Thus, for the same quantization settings, two different images can result in different bitstream sizes. Compression ratios up to 10:1 usually do not reveal noticeable artifacts for the human observer.

In video compression—which is the art of compressing a sequence of image frames—the expression "bitrate" (or simply "rate") is commonly used instead of the compression ratio. A bitrate has units of bits per time (usually bits per second). A bitrate implies a certain number of image frames per second ("frame rate"), from which the uncompressed size of all the frames within one second can be calculated. A compressed bitstream of one second—a file that contains all the frames of one second interval in compressed form—has a certain size which is expressed as the bitrate. An algorithm that controls the size of this bitstream is called a rate control algorithm. However, a special case of a rate control algorithm is to compress only one frame. Therefore, compression ratio and rate can be used interchangeably.

Prior Art FIG. 1 shows some of the steps used in one embodiment of a compression scheme for compressing image data (e.g., in a codec) using a discrete cosine transform (DCT) based encoder such as MPEG or JPEG. A codec can be implemented either in software or hardware or a combination of hardware and software.

In step 10, uncompressed image data are retrieved from computer system memory or a data storage device. In step 20, pre-processing stages known in the art such as downsampling, color-space conversion, and digitizing are performed.

In step 30, a DCT is performed to convert the image data into a two-dimensional frequency space. Typically, most images contain little high frequency information, and so most of the transformed image data are concentrated into the low frequency components (referred to as DCT coefficients). A DCT is typically applied to eight-by-eight blocks of pixels (8×8 blocks), thus resulting in 64 DCT coefficients per image component that are arranged in an 8×8 array. Usually, several neighboring 8×8 blocks of pixel data are grouped together as a macroblock. The DCT transformation does not reduce the amount of image data.

In step 40, the quantization step, some of the frequency information is in essence discarded, so that fewer bits can be used to describe the image. Consider, for example, that there may be 256 possible levels of coloration (e.g., from lightest to darkest) for a pixel. Therefore, prior to quantization, each level would be identified by a unique combination of eight bits. However, using quantization, the 256 possible levels can be quantized into 16 steps of 16 levels each, each step identified by a unique combination of only four bits.

Using DCT, information in the lower frequency coefficients can be quantized more discretely using a relatively large number of bits, while the higher frequency coefficients can be quantized on a cruder basis using a relatively small number of bits. Thus, lower frequency coefficients might be quantized into 16 steps, each represented using four bits as described above while higher frequency coefficients are quantized into one or two steps, each represented by one bit or by a value of zero.

As mentioned above, for the JPEG and MPEG codecs, an image is typically transformed into 8×8 blocks of DCT coefficients for each component. Similarly, the size of the quantization steps to be applied to the DCT coefficients are arranged in an 8×8 array referred to as a quantization table, such that an entry in the quantization table corresponds to a location in the array of DCT coefficients.

The quantization table drives the amount of compression (the compression ratio) because it specifies the size of the quantization steps. The larger the quantization steps, the greater the compression ratio, but there will be a commensurate reduction in image quality. Conversely, smaller quantization steps mean that the uncompressed data are more closely represented, thereby maintaining image quality but reducing the compression ratio. Typically, a user specifies the desired level of image quality by specifying a quantization parameter, and a quantization table corresponding to that quantization parameter is selected and implemented. For example, in JPEG the quantization parameter is usually specified by selecting a number between zero and 100, with 100 corresponding to the highest level of image quality. The quantization parameter may be a factor that scales a given quantization table.

Continuing With Prior Art FIG. 1, in step 50, variable length coding (entropy coding) is performed using, for example, Huffman encoding. In this step, strings of often-repeated characters are replaced by variable-length codes, with the most common strings getting the shortest codes. In step 60, the compressed image data can be stored in memory for subsequent use. The sum of all the variable length codes is called the bitstream. The size of the bitstream (measured in bits or bytes) varies as a function of the amount of quantization as well as a function of the image data.

A desirable feature of a codec is control of the compression ratio ("rate control"). Rate control means that a target compression ratio is specified; when the image data are compressed according to the target compression ratio, the length of the resultant bitstream is equal to or less than the target size. The length of bitstream is usually measured in bits or bytes. With proper rate control, it is possible to efficiently allocate file space for the compressed data, since the required amount of space is roughly known. Otherwise, if too much file space is allocated, the compressed data will not fill the allocated file space and computer system memory is wasted. On the other hand, if too little file space is allocated, then the compressed data will not fit into the allocated file space, causing an error in the computation. In this situation, either the data must be further compressed or the size of the file must be increased.

Rate control is also desirable for videos comprising multiple image frames because it allows a constant file size to be specified for the compressed data for each frame. Ideally, the amount of compressed data will be relatively constant from frame to frame, and thus the target file size will be constant from frame to frame. This is desirable because, in addition to the reasons above, when the compressed data are subsequently retrieved from a file for processing, it may be necessary to specify in advance the size of the file or the range of memory addresses where the compressed data are located. Thus, a relatively constant file size makes this task easier.

However, a problem with the prior art is that it is not possible to quickly and easily implement rate control. As described above, the desired level of image quality is specified, either by a user or in an algorithm, by choosing a quantization parameter or a quantization table. The set of image data are compressed using the selected quantization table, and after the all of the data are compressed, the resultant compression ratio can be determined. However, it may turn out that the resultant compression ratio is unsatisfactory (that is, the compressed data may not properly fit the allocated file space). Consequently, the user must specify a new quantization parameter, and the set of image data must again be compressed to determine the new compression ratio. This process may need to be repeated until, through iteration or trial-and-error, the user eventually arrives at a quantization parameter that achieves the desired compression ratio so that the compressed data properly fit into the allocated file space.

For an arbitrary image, it is not possible to predict the compressed size accurately without analyzing the image. This analysis may require considerable computational resources. Thus, the prior art is problematic because the user must perform multiple compressions of an image frame in order to arrive at the target file size. These computations can take an unacceptable amount of time to complete while monopolizing the computational resources available.

Accordingly what is needed is a method for compressing image data (including video data) that allows rate control in less computation time than it takes to compress the image. The present invention provides a novel solution to this need. These and other objects and advantages of the present invention will become obvious to those of ordinary skill in the art after having read the following detailed description of the preferred embodiments which are illustrated in the various drawing figures.

DISCLOSURE OF THE INVENTION

The present invention pertains to a method of quickly compressing image data to achieve a desired compression ratio corresponding to a desired bitstream size (e.g., rate control). The present invention provides a method for compressing image data (including video data) that allows rate control to be efficiently practiced, and reduces the need for unnecessary iterations in order to arrive at a compression ratio that properly fits the compressed data into the target file space. The present invention also, provides a method that can be implemented using JPEG (Joint Photographic Experts Group) and MPEG (Motion Pictures Experts Group) codecs. The present invention allows rate control in less computation time than it takes to compress the image; the time to estimate the target quantization parameter can be done in less computation time than needed to compress the full image.

In the present embodiment of the present invention, a target compression ratio (the ratio of uncompressed image data to compressed image data) is specified based on a target file size for the compressed data. A subset of the image data is selected. A first quantization parameter is selected, the subset of the image data is compressed using that quantization parameter, and the resulting compression ratio is calculated. A second quantization parameter is then selected, the subset of the image data is compressed using more quantization parameters, and the resulting compression ratio is calculated. A target quantization parameter corresponding to the target compression ratio is calculated by interpolating between the first quantization parameter and the second quantization parameter and the corresponding compression ratios. The target quantization parameter is applied to compress the entire set of image data at approximately the target compression ratio. As a result, the size of the file containing the compressed data is approximately the same as the target file size.

If necessary, additional quantization parameters can be selected and applied to the subset of image data in order to accumulate additional results that can be used for the interpolation process. Also, methods other than interpolation can be used to determine the target quantization parameter.

In one embodiment, the image is encoded as a plurality of macroblocks, and a subset of the macroblocks is selected and used for the interpolation process described above. In this embodiment, every n-th macroblock (e.g., every fifth, every eighth, etc.) is selected and included in the subset. Alternatively, macroblocks can be selected at random to form the subset, or a lookup table can be used to form the subset.

In accordance with the present invention, the image data can be compressed using a JPEG compression scheme or a MPEG compression scheme.

By working on a subset of the image data to determine the target quantization parameter, the amount of data that needs to be processed is significantly reduced, and so the target quantization parameter can be quickly determined. In accordance with the present invention, the time to estimate the target quantization parameter is less than the computation time needed to compress the full image.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "selecting" or "compressing" or "calculating" or the like, refer to the action and processes of a computer system (e.g., the process of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
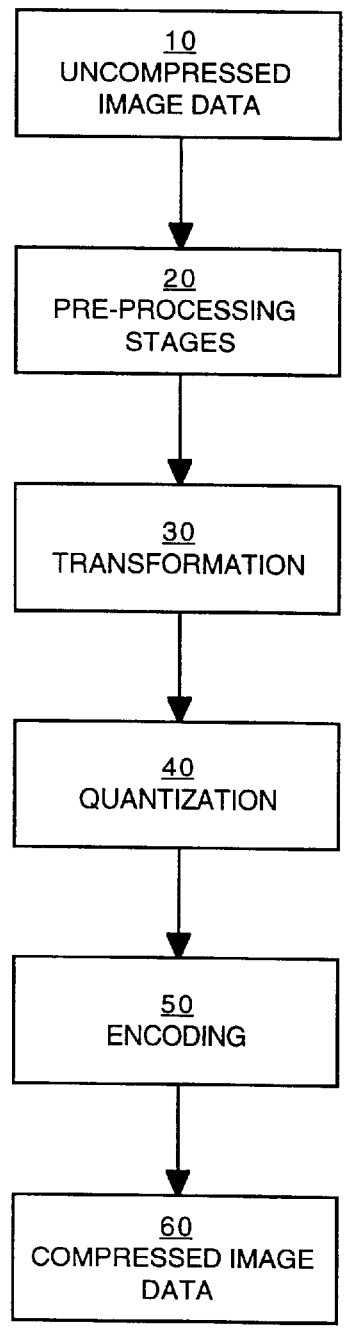
FIG. 1 is a flowchart of an exemplary process for compressing image data.
Figure 2:
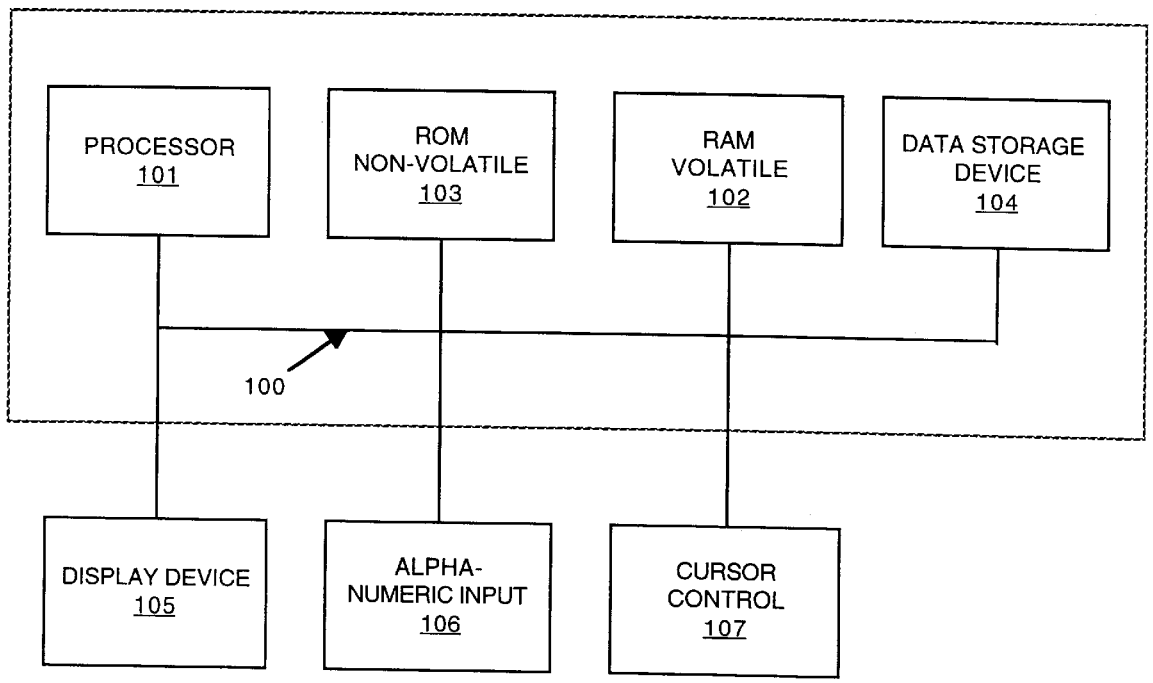
FIG. 2 is a block diagram of a general purpose computer system in accordance with one embodiment of the present invention.

Refer to FIG. 2 which illustrates a general purpose computer system 190 in accordance with one embodiment of the present invention. In general, computer system 190 comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, a display device 105 coupled to bus 100 for displaying information to the computer user, an optional alphanumeric input device 106 including alphanumeric and function keys coupled to bus 100 for communicating information and command selections to central processor 101, and an optional cursor control device 107 coupled to bus 100 for communicating user input information and command selections to central processor 101.

Display device 105 utilized with computer system 190 of the present invention may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

Figure 3A:
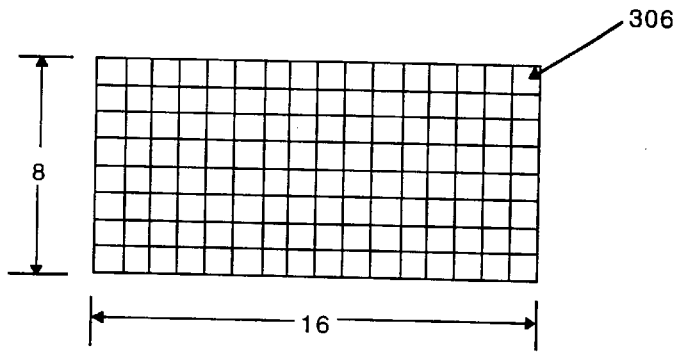
FIG. 3A is an illustration of a macroblock composed of 8×8 blocks in accordance with one embodiment of the present invention.
Figure 3A:
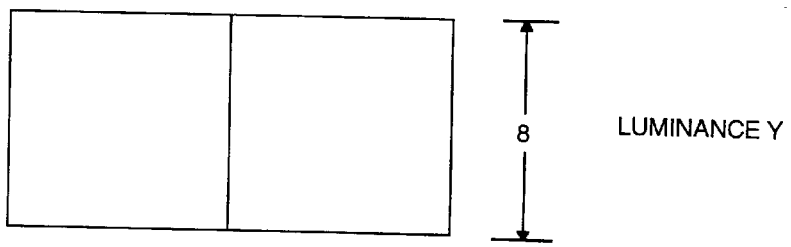
Figure 3A:
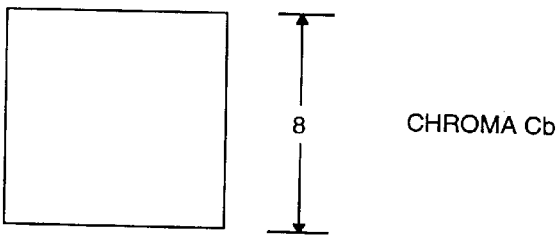
Figure 3A:
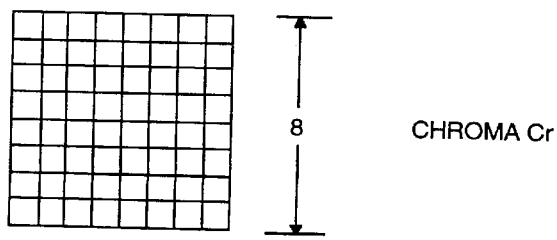

FIG. 3A is an illustration of an exemplary macroblock 305 composed of eight-by-eight (8×8) blocks in accordance with one embodiment of the present invention. In general, one macroblock consists of one or more 8×8 blocks. An 8×8 block is an array with 64 pixel values of one color component. Generally, a macroblock contains pixels of the same region in a image frame, and the amount of pixels is equal to or less than the sum of all the pixels in the image frame. Note that, depending on the standard, different terms can be used when referring to a macroblock; for example in JPEG the term MCU (minimum coded unit) is used instead of macroblock.

In this embodiment, macroblock 305 contains pixels (exemplified by pixel 306) arranged as a rectangle having a size of 16 by eight (8) pixels; however, it is appreciated that macroblocks of other sizes and shapes may be used in accordance with the present invention. In this embodiment, macroblock 305 contains pixels in the YCrCb color space (that is, a pixel 306 consists of one or more values associated with the Luminance component Y, the Chroma component Cr, and the Chroma component Cb); however, it is appreciated that in another embodiment a pixel can consist of one or more color values (e.g., Red, Green, or Blue). The use of macroblocks to represent image data in an image frame is well known in the art.

In the embodiment of FIG. 3A, the chroma components are horizontally down-sampled by a factor two, and therefore the chroma components have 8 vertical pixels. Thus, macroblock 305 contains two luminance 8×8 blocks 9307) and one 8×8 block for each of the two color components (308 and 309).

Figure 3B:
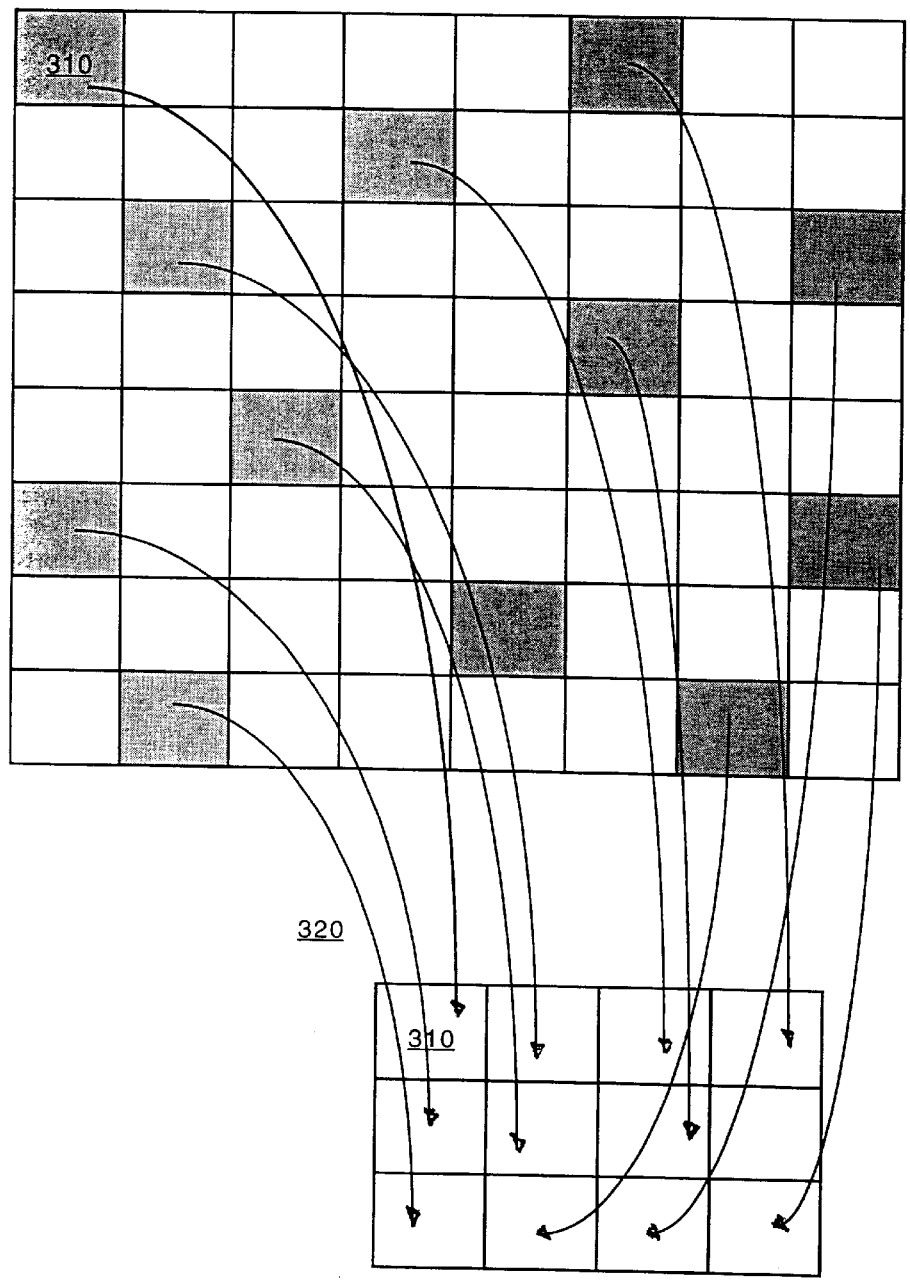
FIG. 3B illustrates a subset of image data generated from an image frame in accordance with one embodiment of the present invention.

FIG. 3B illustrates an image frame 300 represented using a plurality of macroblocks, exemplified by macroblock 310, in accordance with one embodiment of the present invention. Macroblock 310 represents a basic unit of coding within image frame 300. Image frame 300 is typically divided into an array of macroblocks. Each macroblock comprises a plurality of pixels, and each pixel is associated with data defining the luminance, chrominance, and other characteristics of the pixel.

In accordance with, the present invention, a subset 320 of image frame 300 is formed by selecting a subset of the macroblocks that make up image frame 300. In the present embodiment, the subset of macroblocks includes one or more neighboring macroblocks; that is, the subset is selected from macroblocks from the same region of the image. Subset 320 can be formed by selecting every n-th macroblock of image frame 300; that is, every fourth macroblock, every sixth macroblock, every tenth macroblock, etc. Alternatively, subset 320 can be formed by selecting macroblocks at random. Another alternative is to use a lookup table for selecting the macroblocks. In a preferred embodiment, between four and ten percent of the image data in image frame 300 is included in subset 320.

As will be seen, subset 320 is used to determine a target quantization parameter that is subsequently used for compressing image frame 300 according to a target compression ratio. By first working on subset 320 of image frame 300, the amount of data that needs to be processed is significantly reduced, and so the target quantization parameter can be efficiently determined. Thus, in accordance with the present invention, the time to estimate the target quantization parameter is less than the computation time needed to compress the full image.

Figure 4:
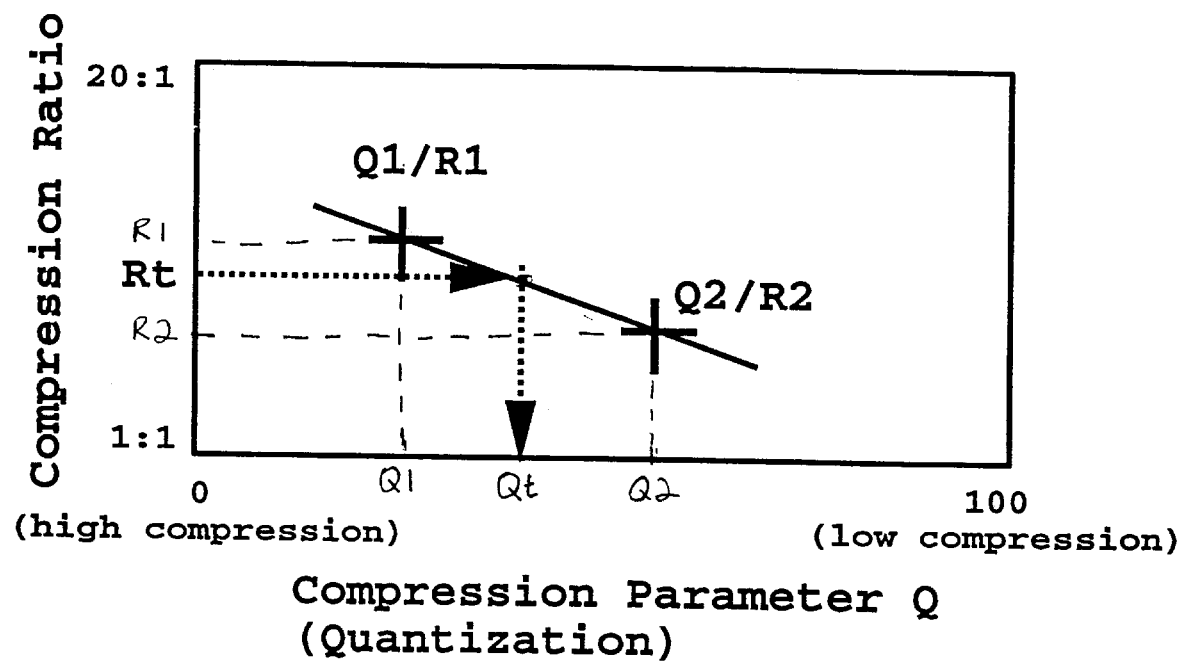
FIG. 4 is a diagram illustrating a method for determining the quantization parameter corresponding to the target compression ratio in accordance with one embodiment of the present invention.

FIG. 4 is a diagram illustrating one embodiment of a method for determining the quantization parameter (e.g., Qt) corresponding to the target compression ratio Rt in accordance with the present invention. The quantization parameter can be a scale factor for an arbitrary quantization table, an input to a function that generates a quantization table, an index to set of different quantization tables, or the like.

In one embodiment, the target compression ratio Rt is the amount of compression specified by a user in order to compress the image data (e.g., image frame 300) by the amount that is necessary to fit image frame 300 into a particular file in the memory of a computer system (e.g., RAM volatile 102 of FIG. 2). That is, when image frame 300 is compressed according to the target compression ratio Rt, the resultant bitstream is equal to or less than the size of the computer system file in which the compressed data are to be stored. FIG. 4 shows a range from 1:1 to 20:1 for compression ratio; however, it is appreciated that a different range may be used in accordance with the present invention.

In other embodiments, the initial (target) quantization parameter can be selected using the following methods: by random, by applying a constant value, by using a quantization parameter based on a previous compression effort in a previous or future image, by selecting a value from a lookup table, or by applying a function that uses as its input values the pixel data from a previous or a future image.

With reference to both FIG. 3B and FIG. 4, in accordance with the present embodiment of the present invention, a first quantization parameter Q1 is specified by a user or otherwise selected as described above. Specification of a quantization parameter by a user is a technique commonly used in codecs and is known in the art. The uncompressed data of subset 320 are compressed based on the first quantization parameter Q1 using a known technique, such as a JPEG (Joint Photographic Experts Group) or a MPEG (Motion Pictures Experts Group) codec. A first compression ratio R1 is then determined for subset 320, for example by comparing the size of the bitstream or the number of bits associated with the uncompressed data of subset 320 to the size of the file or the number of bits associated with the compressed data of subset 320. Similarly, a second quantization parameter Q2 is selected by a user, the uncompressed data of subset 320 are compressed based on Q2, and the corresponding compression ratio R2 for subset 320 is determined. It is appreciated that compression ratios can be calculated for more than two quantization parameters in accordance with the present invention (refer to FIG. 5).

In accordance with the present embodiment of the present invention, the target quantization parameter Qt for subset 320 is then determined based on Q1/R1 and Q2/R2. In the present embodiment, the target quantization parameter Qt is determined by linear interpolation, for example by solving the following equation for Qt, where Q1, Q2, R1, R2 and Rt are known:

$$(Qt-Q1)/(Q2-Q1)=(Rt-R1)/(R2-R1).$$

Linear interpolation between the two data points Q1/R1 and Q2/R2 provides sufficient accuracy for determining the target quantization parameter Qt; however, it is appreciated that methods other than linear interpolation may be used to determine Qt in accordance with the present invention. The target quantization parameter Qt is applied to the entire set of image data (e.g., image frame 300) in order to compress image frame 300 by an amount approximately equal to the target compression ratio Rt.

Figure 5:
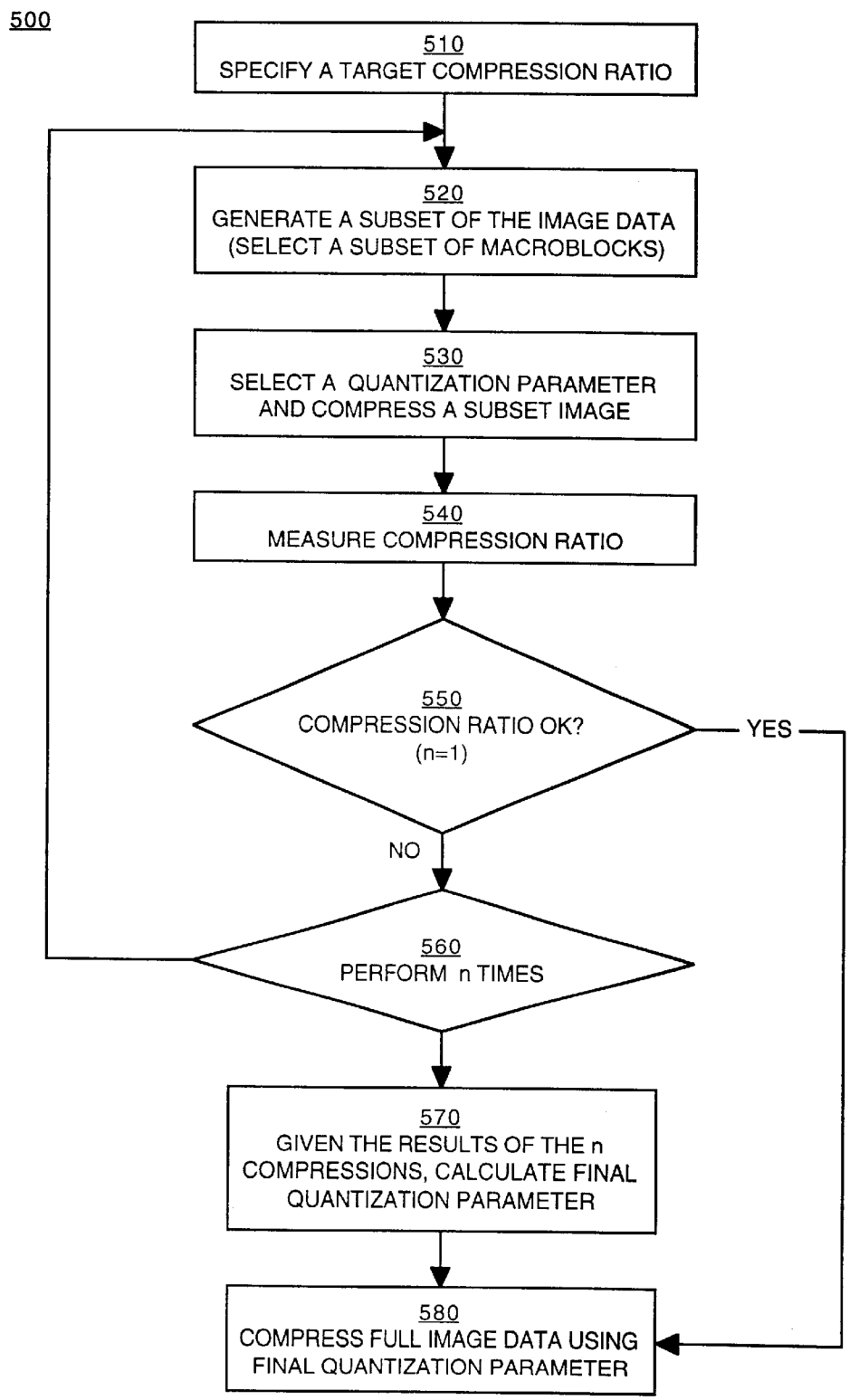
FIG. 5 is a flowchart of the steps in a process for compressing image data according to a target compression ratio in accordance with one embodiment of the present invention.

FIG. 5 is a flowchart of the steps in a process 500 for compressing image data (e.g., image frame 300 of FIG. 3B) according to a target compression ratio Rt (FIG. 4) in accordance with one embodiment of the present invention. Process 500 can be implemented via computer-readable program instructions stored in a memory unit (e.g., random access memory 102, read-only memory 103, and/or data storage device 104) and executed by processor 101 of computer system 190 (FIG. 2). Process 500 can be implemented in a codec such as a JPEG or MPEG codec executed in software or hardware or in a combination of software and hardware. In the present embodiment, the present invention is described for a DCT-based compression scheme. However, it is appreciated that the present invention can be applied to any lossy block based image or video compression method.

In step 510 of FIG. 5, in the present embodiment, a user specifies a target compression ratio Rt. The target compression ratio Rt can be specified based on a target file size for the compressed image data. In other words, a particular file size for the compressed data is desired, and correspondingly a compression ratio is specified so that the uncompressed data will be compressed sufficiently to allow the compressed data to fit into the particular file size (the size of the target file). Thus, for example, if the amount of uncompressed data is equal to 10,000 bytes and the target file size is 1000 bytes, the target compression ratio Rt is 10:1. In other embodiments, the initial (target) quantization parameter can be selected using the following methods: by random, by applying a constant value, by using a quantization parameter based on a previous compression effort in a previous or future image, by selecting a value from a lookup table, or by applying a function that uses as its input values the pixel data from a previous or a future image.

In step 520, a subset (e.g., subset 320 of FIG. 3B) of image frame 300 is selected. When image frame 300 is represented using macroblocks (e.g., macroblock 310 of FIG. 3A), subset 320 can include one or more macroblocks selected from image frame 300. In that case, the macroblocks included in subset 320 can be selected at random or, for example, every n-th block (e.g., every fifth block, etc.) can be selected and included in subset 320. Alternatively, a lookup table can be used for selecting the macroblocks. In a preferred embodiment, between four and ten percent of the image data in image frame 300 is included in subset 320 (e.g., every 25th macroblock).

In step 530 of FIG. 5, a first quantization parameter (e.g., Q1 of FIG. 4) is selected and used to compress subset 320 in a known manner (for example, using a JPEG or MPEG codec). At this stage of process 500, only subset 320 is compressed, and so less computer resources are needed relative to the resources needed to compress the entire set of image data, and the computational time is also less. For example, if ten percent of the image data is included in subset 320, the amount of time needed to compress subset 320 is approximately ten percent of the time needed to compress the entire set of image data.

In step 540, the compression ratio from step 530 is measured (e.g., compression ratio R1 of FIG. 4). The compression ratio R1 is readily determined by comparing the amount of uncompressed data in subset 320 to the resultant amount of compressed data.

In step 550, if R1 compares favorably to Rt or is approximately equal to Rt, then the quantization parameter Q1 can be applied to the entire set of image data (refer to step 580); in this case, Q1 is the target quantization parameter Qt. If R1 does not compare favorable to Rt or is not approximately equal to Rt, then process 500 proceeds to step 560 in order to calculate the target quantization parameter Qt.

In step 560, the steps 520 through 550 can be performed multiple times (e.g., n times). For example, a user may specify the number of times these steps are to be performed. In one embodiment, these steps are performed twice (n=2), so that a first and a second quantization parameter are determined.

In step 570, the target quantization parameter Qt (FIG. 4) is determined using the results (the quantization, parameter and the compression ratio) from each of the n compressions performed in steps 520 through 560. In the present embodiment, the target quantization parameter Qt is determined by linear interpolation. In one embodiment, when n=2, the target quantization parameter is determined by solving the following equation for Qt, where Q1, Q2, R1, R2 and Rt are known:

$$(Qt-Q1)/(Q2-Q1)=(Rt-R1)/(R2-R1).$$

Linear interpolation provides a sufficiently accurate method for determining Qt for subset 320. Thus, for subset 320, the target quantization parameter Qt corresponds approximately to the target compression ratio Rt.

In step 580, the target quantization parameter Qt from step 580 or from step 550 is applied to the full set of image data in image frame 300 in order to compress the image data. The resultant compression ratio will be equal to or approximately equal to Rt.

In summary, in accordance with the present invention, a target quantization parameter Qt is determined for a subset (e.g., subset 320) of the image data in an image frame (e.g., frame 300). The target quantization parameter Qt for the subset of data is applied to the full set of data, and the full set of image data is compressed accordingly. The resultant compression ratio for the entire set of image data is approximately equal to the target compression ratio Rt. In particular, when subset 320 comprises at least approximately four to ten percent of the full set of image data, the target quantization parameter Qt determined in accordance with the present invention will result in a compression ratio for the full set of image data approximately equal to the target compression ratio Rt. If subset 320 comprises more than four to ten percent of the full set of image data, a calculation of Qt more accurately corresponding to Rt may result.

It will be apparent to one of ordinary skill in the art that the present invention can be readily applied to a plurality of image frames including, for example, successive frames in a video. As such, each image frame can be compressed by an appropriate amount so that the compressed data for each frame will fit into similarly sized files. In accordance with the present invention, a user can readily determine the quantization parameter for each frame that will allow the uncompressed image data for that frame to be compressed by an amount sufficient for the compressed data to fit into the target file size. For example, one image frame can be compressed by one amount by determining the appropriate quantization parameter for that frame, and a second image frame can be compressed by a different amount by determining the appropriate quantization parameter for the second frame. Therefore, the resultant amount of compressed data, and hence the size of the file containing the compressed data, will be approximately the same for each frame.

Thus, rate control (that is, controlling the size of the files containing the compressed image data so that each file is approximately the same size) is quickly and efficiently achieved in accordance with the present invention. The present invention allows rate control in less computation time than it takes to compress the image; the time to estimate the target quantization parameter can be done in less computation time than needed to compress the full image. With proper rate control, it is possible to efficiently allocate file space for compressed data. The present invention provides a systematic method for determining a quantization parameter that will yield the desired compression ratio, and avoids unnecessary iterations or trial-and-error guessing. Furthermore, the present invention is readily implemented in JPEG and MPEG codecs.

The preferred embodiment of the present invention, constant bitrate algorithm for block based image compression, is thus described. While the present invention has been described in particular embodiments, it should be appreciated that the present invention should not be construed as limited by such embodiments, but rather construed according to the following claims.

What is claimed is:

1. A method of compressing image data for an image, said method comprising:
   a) receiving a target compression ratio specifying a ratio of uncompressed image data to compressed image data;
   b) selecting a subset of said image data;
   c) compressing image data in said subset using a first quantization parameter;
   d) calculating a first compression ratio for said subset;
   e) calculating a target quantization parameter based on said first quantization parameter and said first compression ratio, said target quantization parameter corresponding approximately to said target compression ratio; and
   f) compressing said image data using said target quantization parameter.

2. The method of compressing image data as recited in claim 1 wherein said image is encoded as a plurality of macroblocks and wherein said step b) comprises the step of:

b1) selecting a subset of said plurality of macroblocks.

3. The method of compressing image data as recited in claim 2 wherein said step b1) comprises the step of:

selecting every n-th macroblock from said plurality of macroblocks to form said subset.

4. The method of compressing image data as recited in claim 2 wherein said step b1) comprises the step of:

selecting macroblocks at random from said plurality of macroblocks to form said subset.

5. The method of compressing image data as recited in claim 2 wherein said step b1) comprises the step of:

using a lookup table to select macroblocks from said plurality of macroblocks to form said subset.

6. The method of compressing image data as recited in claim 1 further comprising the steps of:

compressing image data in said subset using a second quantization parameter;

calculating a second compression ratio for said subset; and calculating said target quantization parameter by interpolation between said first quantization parameter and said second quantization parameter.

7. The method of compressing image data as recited in claim 1 wherein said compressing is performed using a Joint Photographic Experts Group (JPEG) compression scheme.

8. The method of compressing image data as recited in claim 1 wherein said compressing is performed using a Motion Pictures Experts Group (MPEG) compression scheme.

9. The method of compressing image data as recited in claim 1 wherein said subset includes approximately four to ten percent of said uncompressed image data.

10. A computer system comprising:

a bus;

a processor coupled to said bus; and a memory unit coupled to said bus, said processor for executing a method for compressing image data for an image, said method comprising the steps of:

a) receiving a target compression ratio specifying a ratio of uncompressed image data to compressed image data;

b) selecting a subset of said image data;

c) compressing image data in said subset using a first quantization parameter;

d) calculating a first compression ratio for said subset;

e) calculating a target quantization parameter based on said first quantization parameter and said first compression ratio, said target quantization parameter corresponding approximately to said target compression ratio; and f) compressing said image data using said target quantization parameter.

11. The computer system of claim 10 wherein said image is encoded as a plurality of macroblocks and wherein said step b) of said method comprises the step of:

b1) selecting a subset of said plurality of macroblocks.

12. The computer system of claim 11 wherein said step b1) comprises the step of:

selecting every n-th macroblock from said plurality of macroblocks to form said subset.

13. The computer system of claim 11 wherein said step b1) comprises the step of:

selecting macroblocks at random from said plurality of macroblocks to form said subset.

14. The computer system of claim 11 wherein said step b1) comprises the step of:

using a lookup table to select macroblocks from said plurality of macroblocks to form said subset.

15. The computer system of claim 10 wherein said method further comprises the steps of:

compressing image data in said subset using a second quantization parameter;

calculating a second compression ratio for said subset; and calculating said target quantization parameter by interpolating between said first quantization parameter and said second quantization parameter.

16. The computer system of claim 10 wherein said compression of said image data is performed using a Joint Photographic Experts Group (JPEG) encoding scheme.

17. The computer system of claim 10 wherein said compression of said image data is performed using a Motion Pictures Experts Group (MPEG) encoding scheme.

18. The computer system of claim 10 wherein said subset includes approximately four to ten percent of said uncompressed image data.

19. A method of compressing image data for an image encoded as a plurality of macroblocks, said method comprising:

a) receiving a target compression ratio specifying a ratio of uncompressed image data to compressed image data;

b) selecting a subset of said plurality of macroblocks;

c) compressing image data in said subset using a first quantization parameter;

d) calculating a first compression ratio for said subset;

e) compressing image data in said subset using a second quantization parameter;

f) calculating a second compression ratio for said subset;

g) calculating a target quantization parameter by interpolating between said first quantization parameter and said second quantization parameter, said target quantization parameter corresponding approximately to said target compression ratio; and h) applying said target quantization parameter to said plurality of macroblocks to compress said image data.

20. The method of compressing image data as recited in claim 19 wherein said step b) comprises the step of:

selecting every n-th macroblock from said plurality of macroblocks to form said subset.

21. The method of compressing image data as recited in claim 19 wherein said step b) comprises the step of:

selecting macroblocks at random from said plurality of macroblocks to form said subset.

22. The method of compressing image data as recited in claim 19 wherein said step b) comprises the step of:

using a lookup table to select macroblocks from said plurality of macroblocks to form said subset.

23. The method of compressing image data as recited in claim 19 wherein said compressing is performed using a Joint Photographic Experts Group (JPEG) compression scheme.

24. The method of compressing image data as recited in claim 19 wherein said compressing is performed using a Motion Pictures Experts Group (MPEG) compression scheme.

25. The method of compressing image data as recited in claim 19 wherein said subset includes approximately four to ten percent of said uncompressed image data.

* * * * *